INVENTOR.
NICHOLAS YASHIN
BY Arthur H. Swanson
ATTORNEY.

Aug. 31, 1965 N. YASHIN 3,204,187

REGISTER EMPLOYING PLURALITY OF SEQUENTIALLY OPERATED BISTABLE ELEMENTS PROVIDING DIGITAL OUTPUTS REPRESENTATIVE OF ANALOG INPUT

Filed Feb. 20, 1962

2 Sheets-Sheet 2

*INVENTOR.*
NICHOLAS YASHIN

BY Arthur H. Swanson

ATTORNEY.

3,204,187
Patented Aug. 31, 1965

3,204,187

REGISTER EMPLOYING PLURALITY OF SEQUENTIALLY OPERATED BISTABLE ELEMENTS PROVIDING DIGITAL OUTPUTS REPRESENTATIVE OF ANALOG INPUT

Nicholas Yashin, Philadelphia, Pa., assignor to Honeywell Inc., a corporation of Delaware Filed Feb. 20, 1962, Ser. No. 174,419
5 Claims. (Cl. 328—105)

This invention relates to electronic apparatus. More specifically, the present invention relates to electronic analog to digital converters.

An object of the present invention is to provide an improved analog to digital converter featuring a self-governing conversion operation.

Another object of the present invention is to provide an improved analog to digital converter featuring a continuous conversion operation.

A further object of the present invention is to provide an improved register for governing a conversion operation.

A still further object of the present invention is to provide an improved analog to digital converter, as set forth herein, having a simple operation and construction.

In accomplishing these and other objects, there has been provided, in accordance with the present invention, an analog to digital converter having a reference signal circuit for sequentially producing reference signals to be compared with an analog input signal by a decision amplifier. The output signal from the decision amplifier is applied to a register circuit to determine the analog value of the reference signal. The register circuit is effective to sequentially produce reference signals for the comparison operation by the decision amplifier. The output signal from the decision amplifier is effective to control the retention of an experimental reference signal. If the reference signal is smaller than the input signal, the reference signal is retained. Conversely, if the reference signal is larger than the input signal, it is removed. In either case a new reference signal is automatically supplied by the subsequent combined operation of the reference source and the register. The final condition of the register is indicative of the retained reference signals. A new digitizing cycle is automatically initiated by the continuing operation of the register.

A better understanding of the present invention may be had by reading the following description in connection with the attached drawings, in which.

Figure 1:
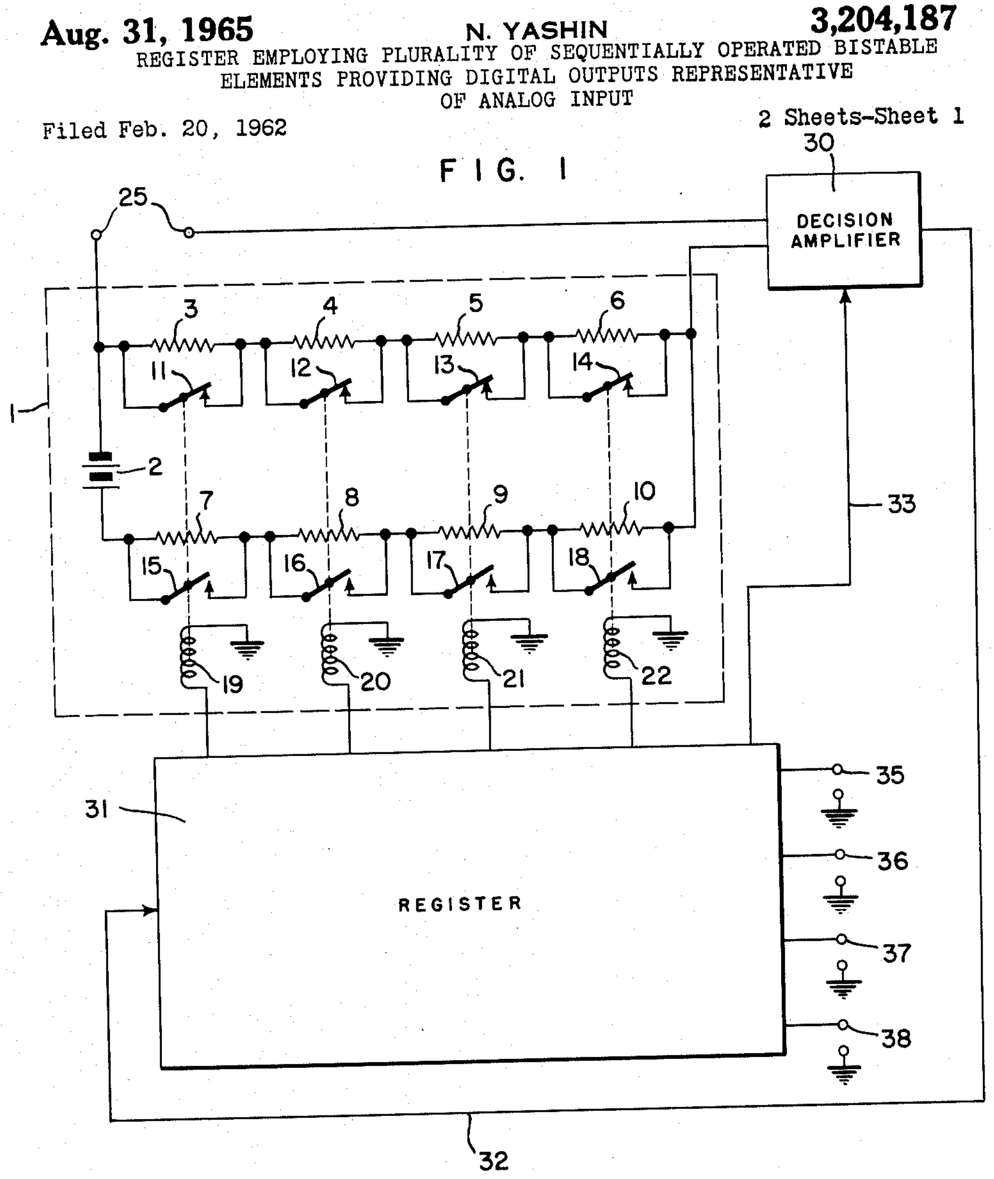
FIG. 1 is a schematic illustration of an analog to digital converter embodying applicant's invention.

Referring to FIG. 1, there is shown an analog to digital converter having a reference signal circuit 1 comprising a source of an energizing signal, represented by the battery 2 and a plurality of resistors 3 to 10 connected across the battery 2. A plurality of relay-operated normally-closed contacts 11 to 14 are connected across respective ones of the first four resistors 3 to 6. Similarly, the second four resistors 7 to 10 each have connected thereacross a respective one of a plurality of relay-operated normally-open contacts 15 to 18. Four relay coils 19 to 22 are each provided for operating a corresponding pair of relay contacts; i.e., a normally-open and a normally-closed contact.

A pair of input terminals 25 are provided for connection to a source of an analog-signal to be converted. One of the input terminals 25 is connected to a junction between the battery 2 and a first resistor 3. The other one of the input terminals 25 is connected to a decision amplifier 30 to apply the analog signal as one input signal thereto. The comparison amplifier 30 may be any one of many electronic devices used to compare two voltages and to produce an output signal representative of the compared relationship; such devices being well-known in the art.

A second input signal for the amplifier 30 is obtained from the reference signal circuit 1 by connecting the common point between the fourth resistor 6 and the eighth resistor 10 to the input of the amplifier 30.

Figure 2:
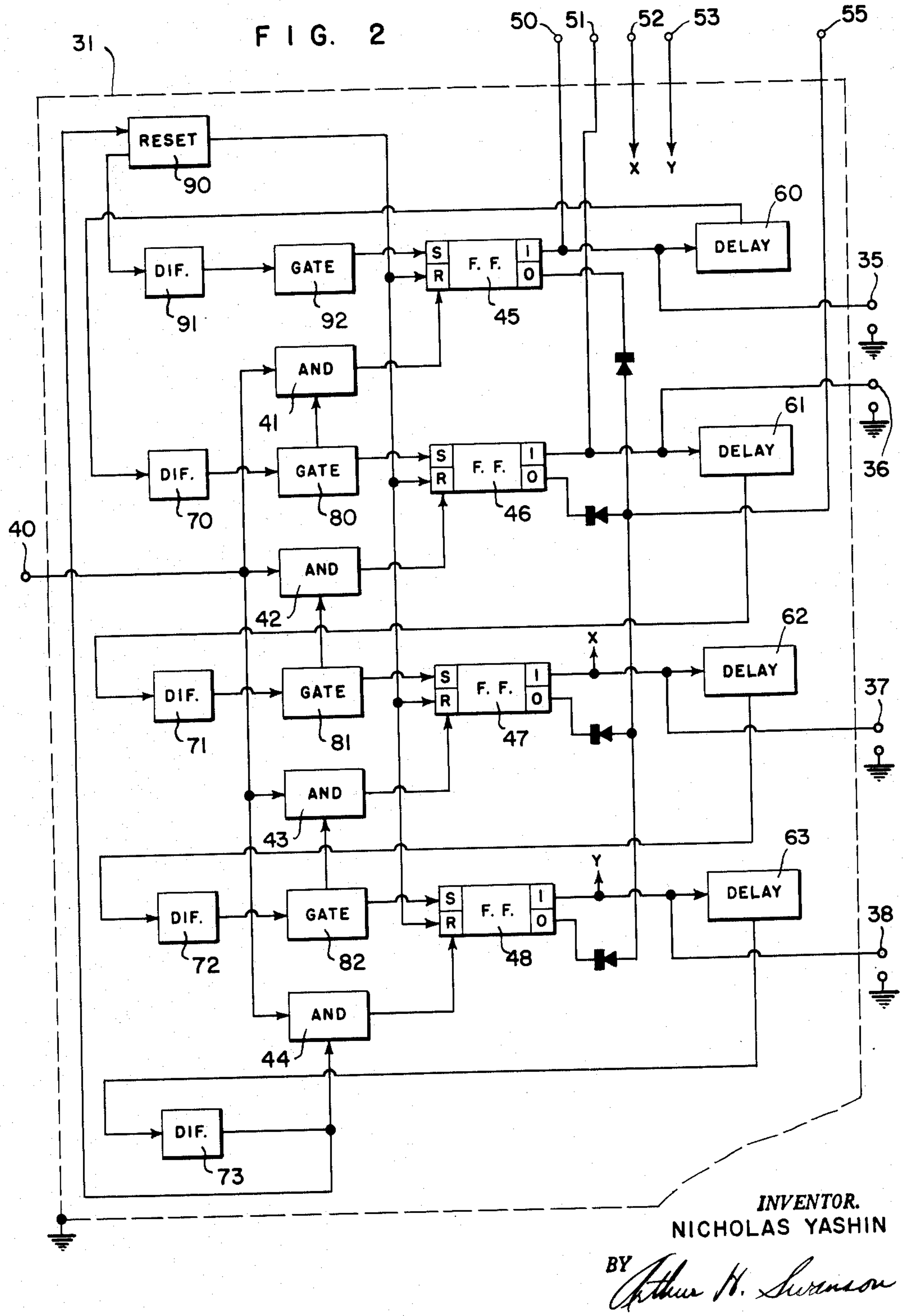
FIG. 2 is a schematic illustration of the register shown in FIG. 1.

A register 31 is provided for sequentially energizing the relay coils 19 to 22 to produce a sequence of predetermined reference signals for application to the amplifier 30. A suitable device for use as register 30 in the present invention is shown in FIG. 2. An output signal from the amplifier 30 indicative of the result of the comparison operation is applied along line 32 to the register 31 to provide a control signal for the sequential operation of the reference signal circuit 1. A feedback signal from the register 31 is applied along line 33 to sequence the comparison operation of the amplifier 30. A plurality of output terminals 35 to 38 are provided for connection to utilization means to provide output signals indicative of the digitizing operation of the present invention. These output signals are used to provide a digital representation of the analog-signal applied to the input terminals 25.

Referring to FIG. 2, there is shown a register suitable for use as register 31 in FIG. 1. The control signal from the amplifier 30, shown in FIG. 1, is applied to terminal 40 for distribution to four "and" circuits 41, 42, 43 and 44. Four "flip-flop" circuits 45, 46, 47 and 48 are provided for sequentially providing individual energizing signals for the relay coils 19 to 22. Accordingly, the "set," or "1," side of each flip-flop is connected to a corresponding one of the relay coils through four register terminals 50, 51 52 and 53. For example, as shown in FIG. 2, flip-flop 45 is connected to terminal 50 for connection to relay coil 19. Similarly, flip-flop 46 is connected to terminal 51 for connection relay coil 20; flip-flop 47 is connected through terminal 52 to coil 21, flip-flop 48 is connected through terminal 53 to coil 22.

The "0" side of each flip-flop is connected through respective isolating diodes to feedback terminals 55 for connection to the amplifier 30. The "1," or set side, of each flip-flop 45 to 48 is also connected to a respective one of the output terminals 35 to 38 for connection to a utilization means. Thus, flip-flop 45 is connected to terminals 35; flip-flop 46 to terminals 36, flip-flop 47 to terminals 37, and flip-flop 48 to terminals 38.

The "1" output signal from each of the flip-flops 45 to 48 is also applied to four signal delay circuits 60 to 63, respectively. An output signal from each of the delay circuits 60 to 63 is applied to respective differentiating circuits 70 to 73 to produce signal pulses therefrom.

An output signal from the three differentiator circuits 70 to 72 is applied to three gate circuits 80 to 82, respectively. An output signal from each of the gate circuits 80 to 82 is applied to set the corresponding flip-flop circuit to an "0" state. Additionally, the output signals from the gate circuits 80; to 82 are applied to the "and" circuits 41 to 43, respectively. Thus, the output signal from the gate circuit 80 is applied to the flip-flop 46 and to the "and" circuit 41. The gate circuit 81 is connected to the flip-flop 47 and to the "and" circuit 42. The gate circuit 82 is connected to the flip-flop 48 and to the "and" circuit 43.

An output signal from the delay 63 is applied to a further differentiator 73. This differentiator 73 is connected to the "and" circuit 44, and to a reset circuit 90 connected, in turn, to a further differentiator 91. An output signal from the reset circuit 90 is connected to reset the flip-flops 45 to 48. An output signal from the differentiator 91 is applied to a gate circuit 92. The gate circuit 92 is connected to provide a signal to set the flip-flop 45.

The operation of the present invention follows:

Assume the relay coils 19 to 22 are initially unenergized and the relay contacts 11 to 18 are in the position shown in FIG. 1. Under these conditions, the flip-flops 45 to 48 of the register 31 are in the "0" state. An analog signal to be converted is applied to the input terminals 25. Since the relay contacts 11 to 14 are in a closed condition, it may be seen that the input terminals 25 are connected directly to the decision amplifier 30.

The battery 2, in this initial state, is connected across the resistors 7 to 10. The voltage drop across these resistors does not appear at the input of the amplifier 30 since the input terminals 25 are directly connected to the amplifier 30. The input signal applied to the input terminals 25, accordingly, is applied directly to the decision amplifier 30.

The decision amplifier 30 is arranged to produce an output signal on line 32 indicative of a predetermined polarity of an input signal appiled thereto. Since the decision amplifier input signal is a combination of an analog signal to be converted to digital form and a reference signal used to nullify the effect of the analog siganl, the output signal from the decision amplifier 30 is arranged to control the operation of the register 31 to produce the reference signal. Specifically, if the analog signal is smaller than the reference signal, the amplifier 30 is arranged to sense the polarity of this combination and to produce an output signal on line 32. Conversely, if the analog signal is greater than the reference signal, the amplifier 30 is arranged not to produce an output signal on line 32.

The register 31 shown in FIG. 2 is arranged to respond to the output signal from the amplifier 30 on line 32 to produce a variable reference signal. The reference signal is varied by operation of the relays 19 to 22. For example, if the relay 19 is energized by the register 31, the associated contacts 11 and 15 are operated to a position opposite from that shown in FIG. 1. In this position, the resistor 3 is introduced between the input terminals 25 and the amplifier 30 and the resistor 7 is shorted by the contact 15. The voltage drop across resistor 3, thus, is placed in series with the analog signal applie across the input terminals 25. The resistors 3 and 7 are arranged to have similar resistance values so that the aforesaid introduction of one and the shorting of the other is effective to maintain a constant resistance across the battery 2. This constant resistance aids the battery 2 in maintaining a constant voltage drop across the resistors to produce a known precise reference voltage.

The introduction of the voltage drop across resistor 3 is arranged to effect a subtraction of this voltage from the input signal applied to the input terminals 25. The decision amplifier 30 is responsive to a change in the polarity of its input signal to produce an output signal on line 32. If the reference signal across the resistor 3 is greater than the input signal, the decision amplifier 30 will sense a change in polarity of its input signal and produce an output signal on lines 32. Conversely, if the reference signal is smaller than the input signal, the decision amplifier 30 will not produce an output signal on line 32.

The signal on line 32 is applied to the register 31 to control the retention of the reference signal. Thus, each reference signal other than the first, is added to the preceeding reference signal to produce a composite reference signal if the sum is smaller than the analog input signal. If the composite signal is greater than the input signal, the last reference signal is not retained and a smaller succeeding reference signal is added to the preceding retained reference signals. Accordingly, the final sum of the retained reference signals is an analog signal having approximately the same value as the input signal. The resistors in the reference source 1 are arranged to produce reference signals arranged in diminishing amplitudes. Thus, if the reference signal across the first resistor 3 is too large and produces a reversal in polarity of the input signal at the decision amplifier 30, the amplifier 30 is effective to produce an output signal on line 32. This output signal is applied to the register 31 to terminate the application of the reference signal across the resistor 3 by producing a deenergization of the first relay 19 to thereby restore the short across resistor 3. The register 31, then, proceeds to energize the second relay 20 to apply the reference signal across the resistor 4 to the decision amplifier 30 by shorting the resistor 8 and removing the short across the resistor 4. The resistors 4 and 8 are also arranged to have similar values to maintain a constant load on the battery 2. If no output signal from the decision amplifier 30 is received by the register 31, the first relay 19 is retained in an energized state, and the second relay 20 is energized by the subsequent operation of the register 31.

The energization of the relays 19 to 22 is automatically effected by the register 31 with a deenergization of a relay upon the occurrence of an output signal from the decision amplifier 30. After trying all the reference signals from the source 1, the register 31 is effective to produce an indication of which relays were retained in an energized condition. This indication is represented by an energization of the output terminals 35 to 38 in a selective pattern corresponding to the energized relays. For example, if the first relay 19 is retained in an energized state, an output signal from the register 31 is applied to the first output terminal 35.

The output signals from the output terminals 35 to 38 can be applied to indicating devices to produce a digital indication of the analog signal applied to the input terminals 25. After a digitizing cycle is completed by the register 31 in which all the reference signals have been sampled and a final composite reference signal obtained, the register 31 is arranged to deenergize all the relays 19 to 22 and to initiate a new digitizing cycle. Thus, the register 31 is effective to automatically effect a self-governing digitizing cycle, provide a readout of the digitizing operation and terminate the digitizing cycle.

A register suitable for use as register 31 in the present invention is shown in FIG. 2. The register 31 has four bistable flip-flops 45 to 48. These devices have two input circuits, S and R, and two ouput circuits, 1 and 0. The "S", or set, circuit of the flip-flops is arranged to place the flip-flop device, in response to an input signal applied to the set circuit, in a state whereby an output signal appears in the "1" output circuit. Conversely, an input signal applied to the "R", or reset, circuit is effective to produce an output signal from the "0" output circuit. The output signal from the "1" side of each flip-flop is applied to a corresponding one of the relays 19 to 22 through a corresponding one of the relay terminals 50 to 53. This output signal is also applied to a corresponding one of the delay circuits 60 to 63 and to a corresponding one of the output terminals 35 to 38. The output signal from the "0" side of each flip-flop is applied to the decision amplifier 30 through feedback terminal 55 and along line 33 to signal the beginning of a new comparison whereby the output signal from the decision amplifier 30 is terminated. For example, the "1" side of the first flip-flop 45 is connected to the first relay terminal 50 and the output terminal 35. The "0" side of the first fiip-flop 45 is connected to the feedback terminal 55.

A reset circuit 90 is provided to initially reset the flip-flops to an "0" state. This circuit may include a pushbutton, not shown, for effecting a resetting operation at the start of the operation of the analog-to-digital converter. The resetting operation during a continuous operation of the converter is effected by applying a reset signal from the last flip-flop 48 obtained from the last delay circuit 63 to the reset circuit 90. The reset circuit 90 is arranged to produce two output signals upon either the actuation of the push button or the application of the aforesaid reset signal. One of these output signals is applied directly to the reset circuit of each flip-flop 45 to 48 to place the flip-flops in an "0" state. At this time, the relays 19 to 22 are all deenergized and no reference signal is produced by the source 1. The other of the reset circuit output signals is applied to differentiating, or signal shaping circuit, 91. The ouput signal from the shaping circuit 91 is applied through a gate circuit 92 to the set circuit of the first flip-flop 45. This signal is effective to place the flip-flop 45 in the "1" state. The output signal from the "1" side of the flip-flop 45 is applied to the first relay terminal 50 to energize the first relay 19. This energization is effective to introduce the reference signal across the first resistor 3 in the input circuit of the decision amplifier 30, as described above. The "1" state output signal from the flip-flop 45 is also applied to the first output terminal 35 and to the first delay circuit 60 is arranged to delay the applied signal until the decision amplifier 30 has had time to compare the input analog signal and the reference signal and to produce an output signal representative of this comparison.

As previously discussed, the amplifier 30 is effective to produce an output signal when the reference signal is larger than the input signal. This output signal is applied along line 32 to terminal 40 of the register 31. Terminal 40 is connected to four "and" gates 41 to 44. These gates 41 to 44 are arranged to produce an output signal upon the joint application of two input signals thereto. One of these input signals is obtained from the terminal 40. The second signal is obtained from a corresponding one of the delay circuits 60 to 63. For example, the output signal from the first delay circuit 60 is connected through a differentiator 70 to a gate circuit 80. The output signal from the gate circuit 80 is applied as the aforesaid second signal to the first "and" circuit 41. Upon the coincidence of these two input signals to the "and" circuit 41, the circuit 41 is effective to produce an output signal. This output signal is applied to the reset circuit of the first flip-flop 45 to restore the flip-flop 45 to the "0" state.

Summarizing briefly, the operation of the present invention so far includes the application of a reset signal to all the flip-flops 45 to 48 to place them in an "0" state. Then, a delayed signal obtained from the reset signal is applied to the first flip-flop 45 to place it in the "1" state. This state is effective to introduce a first reference signal to be compared with the input analog signal. If the comparison indicates that the reference signal is larger than the input signal, the decision amplifier 30 is effective to produce an output signal on line 32, which signal is applied to terminal 40 of the register 31. In the register 31, this output signal is applied as one input signal to four "and" circuits 41 to 44. The second signal for these "and" circuits is obtained from the flip-flop which had been previously set to the "1" state to supply a reference signal. The second signal is delayed to allow the decision amplifier 30 to complete the aforesaid comparison and to indicate the result on the line 32.

Thus, if the reference signal produced by setting the first flip-flop 45 is larger than the input signal, the amplifier 30 will produce an output signal. This output signal will be applied to the first "and" circuit 41. The subsequent application of the delayed signal from the "1" side of the first flip-flop 45 will be effective to produce an output signal from the "and" circuit 41 to reset the first flip-flop 45. The resetting of this flip-flop is effective to remove the first reference signal from the input circuit of the amplifier 30. Upon the resetting of the flip-flop 45, a signal from the "0" side of this flip-flop is applied to terminal 55 which terminal is connected by line 33 to the amplifier 30. This signal is effective to terminate the output signal from the amplifier 30 on line 32 and to prepare the amplifier 30 for a new comparison operation.

Conversely, if the reference signal is smaller than the input signal, the amplifier 30 does not produce an output signal. Accordingly, the first "and" circuit 41 does not receive two joint input signals since only the delayed flip-flop 45 signal is applied thereto. Under this condition, the "and" circuit does not produce a signal to be applied to reset the first flip-flop 45. The flip-flop 45 is retained in its set condition and the corresponding reference signal is retained in the input circuit to the amplifier 30.

In either case, the delayed signal from the first flip-flop 45 is applied through the gate 80 to the set circuit of the second flip-flop 46. This signal is effective to place the second flip-flop 46 in the "1" state which condition produces an output signal to energize the second relay 20 whereby to introduce a second reference signal to the amplifier 30.

The further operation of the present invention for the second reference signal is similar to that described above for the first reference signal. Briefly, the output signal from the "1" state of the second flip-flop 46 is delayed until the amplifier 30 compares the input analog signal with the new reference signal which reference signal may include the retained first reference signal. The delayed output signal is then applied to a second "and" gate 42. If the output signal from the amplifier 30 is also present, the second flip-flop 46 is reset and the second reference signal is removed from the amplifier 30. The delayed signal is also applied to the third flip-flop 47 to place this flip-flop in a "1" state whereby to introduce a third reference signal to the amplifier 30.

The further operation of the present invention for the third and fourth flip-flops 47 and 48 is similar to that described above for the first and second flip-flops 45 and 46. When the fourth flip-flop 48 has been either reset or retained in its "1" state, the signals appearing on the output terminals 35 to 38 will be indicative of which flip-flops have been retained in a "1" state and, consequently, will be indicative of the desired representation of the input analog signal. Since to input signal has been approximated by the retained reference signals, further operation of the present invention requires that the reference signals be removed in preparation for a new digitizing operation. To accomplish this clearing operation, the delayed signal from the fourth flip-flop 48 is also applied to the reset circuit 90 to produce a reset signal to be used as previously discussed. The reset circuit 90 is effective to further delay the reset operation to enable the conversion operation represented by the state of the four flip-flops 45 to 48 to be read out on the output terminals 35 to 38. Thus, the present invention is arranged to automatically initiate a new digitizing cycle.

Thus, it may be seen that there has been presented, in accordance with the present invention, an electronic analog to digital converter for producing a digital representation of an input analog signal, which converter is characterized by a continuous and self-governing conversion operation.

What is claimed is:

1. A register comprising a plurality of bistable means arranged in an operative sequence, each of said means having a first and a second input circuit and a first and a second output circuit, a plurality of delay circuits, each of said delay circuits having an input circuit and an output circuit, means connecting each of said first output circuits of said bistable means with a respective one of said input circuits of said delay circuits, a plurality of "and" circuits, each of said "and" circuits having two input circuits and an output circuit, means connecting each of said output circuits of said delay circuits with a respective one of said input circuits of said "and" circuits and to a respective one of said first input circuits of a bistable means following in said operative sequence a bistable means connected to the input circuit of the corresponding one of said delay circuits, selective energization input means arranged to provide a connection to a source of selective energizing signals, said energization means being connected to all of the other of said input circuits of said "and" circuits, means connecting said output circuit of each of said "and" circuits to a respective one of said second input circuits of said bistable means, and reset means connecting a delayed output signal from said first output circuit of the last one of said bistable means in said operative sequence to said second input circuits of all of said bistable means.

2. A register comprising a plurality of bistable means arranged in an operative sequence, each of said means having a first and a second input circuit and a first and a second output circuit, a plurality of delay circuits, each of said delay circuits having an input circuit and an output circuit, means connecting each of said first output circuits of said bistable means with a respective one of said input circuits of said delay circuits, a plurality of "and" circuits, each of said "and" circuits having two input circuits and an output circuit, means connecting each of said output circuits of said delay circuits with a respective one of said input circuits of said "and" circuits and to a respective one of said first input circuits of a bistable means following in said operative sequence a bistable means connected to the input circuit of the corresponding one of said delay circuits, selective energization input means arranged to provide a connection to a source of selective energizing signals, said energization means being connected to all of the other of said input circuits of said "and" circuits, and means connecting said output circuit of each of said "and" circuits to a respective one of said second input circuits of said bistable means.

3. A register comprising a plurality of bistable means each having a first and second state and arranged in an operative sequence, a plurality of delay circuits, means connecting each of said delay circuits in a signal responsive relationship with an output signal from said first state of a respective one of said bistable means, an energization input circuit arranged to provide a connection to a source of selective energizing signals, means for combining a signal from said input circuit and an output signal from each of said delay circuits to provide a plurality of separate output signals representative of the presence of respective combined signals, circuit means operative to connect each of the output signals from said means for combining to an input circuit of a respective one of said bistable means to set said bistable means to said second state and means connecting an output signal from each of said delay circuits to a bistable means in said operative sequence following the bistable means producing the delayed signal to set said bistable means in said operative sequence to said first state.

4. A register comprising a plurality of bistable elements having a first and a second state and arranged in an operative sequence, signal delay means operative to connect an output signal from said first state of a bistable element to set a succeeding one of said elements in said sequence to said first state, input signal means arranged to provide a connection to a source of selective signals, and a plurality of combining means each arranged to produce an output signal upon the concurrent occurrence of a signal from said input signal means and a delayed signal from a respective one of said bistable elements to set the element producing the delayed signal to said second state.

5. A register as set forth in claim 4 and including a reset means connected to a delayed signal from the last one of said elements in said sequence and operative to set all the elements in said second state and to subsequently set a first of said elements in said operative sequence in said first state.

References Cited by the Examiner

IBM Technical Disclosure Bulletin, vol. 3, No. 8, January 1961, "Bidirectional Counter," L. J. Rosenberg, page 17.

ARTHUR GAUSS, *Primary Examiner.*

GEORGE N. WESTBY, *Examiner.*